US011915636B2

(12) United States Patent
Lo

(10) Patent No.: US 11,915,636 B2
(45) Date of Patent: Feb. 27, 2024

(54) GAMMA VOLTAGE GENERATOR, SOURCE DRIVER AND DISPLAY APPARATUS

(71) Applicant: NOVATEK MICROELECTRONICS CORP., Taiwan (CN)

(72) Inventor: Chi-Yi Lo, Taiwan (CN)

(73) Assignee: NOVATEK MICROELECTRONICS CORP., Taiwan (CN)

( * ) Notice: Subject to any disclaimer, the term of this patent is extended or adjusted under 35 U.S.C. 154(b) by 0 days.

(21) Appl. No.: 18/128,514

(22) Filed: Mar. 30, 2023

(65) Prior Publication Data

US 2023/0316983 A1 Oct. 5, 2023

Related U.S. Application Data

(60) Provisional application No. 63/325,152, filed on Mar. 30, 2022.

(30) Foreign Application Priority Data

Mar. 20, 2023 (CN) ......................... 202310272342.8
Mar. 28, 2023 (CN) ................................... 112111675

(51) Int. Cl.
*G09G 3/20* (2006.01)

(52) U.S. Cl.
CPC ... *G09G 3/2092* (2013.01); *G09G 2310/0291* (2013.01); *G09G 2320/0233* (2013.01); *G09G 2330/021* (2013.01); *G09G 2330/028* (2013.01)

(58) Field of Classification Search
CPC ......... G09G 3/2092; G09G 2310/0291; G09G 2320/0233; G09G 2330/021; G09G 2330/028; G09G 3/20; G09G 2310/027; G09G 2310/0275
See application file for complete search history.

(56) References Cited

U.S. PATENT DOCUMENTS 10,204,589 B2 * 2/2019 Kim ..................... G09G 3/3688
2013/0249969 A1 * 9/2013 Jeon ..................... G09G 3/3685
345/99

(Continued)

FOREIGN PATENT DOCUMENTS

| | | |
|---|---|---|
| CN | 110444153 | 11/2019 |
| TW | 201426699 | 7/2014 |
| TW | 201510975 | 3/2015 |

*Primary Examiner* — Jose R Soto Lopez
(74) *Attorney, Agent, or Firm* — MARSHALL, GERSTEIN & BORUN LLP

(57) ABSTRACT

A gamma voltage generator, a source driver and a display apparatus are provided. The gamma voltage generator is connected with a plurality of channel circuits and is used for outputting the predetermined number of gamma voltages, and each channel circuit selects at least one gamma voltage according to input display data to generate a corresponding data voltage. The gamma voltage generator includes a plurality of basic buffers and a plurality of dynamic buffers. Each dynamic buffer is configured to operate in a first mode of not outputting a buffer voltage or in a second mode of outputting a buffer voltage, wherein, the plurality of dynamic buffers switch from the first mode to the second mode based on update or change of the display data. The buffer voltages from the two types of buffers are used to generate the gamma voltages.

13 Claims, 11 Drawing Sheets

(56) References Cited

U.S. PATENT DOCUMENTS

| | | | | |
|---|---|---|---|---|
| 2014/0184657 | A1* | 7/2014 | Lee | G09G 3/3208<br>345/690 |
| 2015/0130852 | A1* | 5/2015 | Wang | G09G 3/3696<br>345/690 |
| 2015/0228234 | A1* | 8/2015 | Lin | G09G 3/3685<br>345/212 |
| 2017/0263185 | A1* | 9/2017 | Nakagawa | G09G 3/3233 |
| 2017/0316742 | A1* | 11/2017 | Aoki | G09G 3/3275 |
| 2018/0090084 | A1* | 3/2018 | Zheng | G09G 3/3614 |
| 2019/0340996 | A1* | 11/2019 | Kim | G09G 3/3696 |
| 2020/0234624 | A1* | 7/2020 | Lim | G09G 3/20 |
| 2020/0380904 | A1* | 12/2020 | Yeh | G09G 3/3696 |
| 2021/0335256 | A1* | 10/2021 | Yin | G09G 3/3266 |
| 2022/0059034 | A1* | 2/2022 | Lee | G09G 3/325 |
| 2022/0139349 | A1* | 5/2022 | Park | G09G 3/3688<br>345/87 |
| 2022/0223091 | A1* | 7/2022 | Chae | G09G 3/3225 |

* cited by examiner

GAMMA VOLTAGE GENERATOR, SOURCE DRIVER AND DISPLAY APPARATUS

TECHNICAL FIELD

The present disclosure relates generally to a field of display technologies, and more particularly, to a gamma voltage generator, a source driver including a gamma voltage generator, and a display apparatus.

BACKGROUND

The display apparatus includes a display panel and a driver. The display panel includes scan lines, data lines, and pixels. The driver may include a gate driver and a source driver. Each pixel may transmit light with brightness corresponding to a data voltage supplied through a corresponding data line in response to a gate signal supplied through a corresponding gate line. The gamma voltage generator in the source driver (e.g., included in a source driver integrated circuit (IC)) may generate a plurality of gamma voltages respectively corresponding to a plurality of gray scale values based on gamma reference voltages, and may use respective gamma voltages to convert gray scale values of display data into data voltages, so that each pixel displays based on a corresponding data voltage.

Therefore, it is very important to rapidly settle and stabilize respective gamma voltages used for generating the data voltages to ensure a display effect.

SUMMARY

According to one aspect of the present disclosure, there is provided a gamma voltage generator, connected with a plurality of channel circuits and used for outputting a predetermined number of gamma voltages, each channel circuit selecting at least one gamma voltage according to input display data to generate a corresponding data voltage, wherein, the gamma voltage generator includes: a gamma voltage generating circuit, having a plurality of first voltage input end nodes, a plurality of second voltage input end nodes, and a plurality of voltage output end nodes; a plurality of basic buffers, each basic buffer having an input end for receiving a corresponding gamma reference voltage, and an output end connected to a corresponding first voltage input end node; and a plurality of dynamic buffers, each dynamic buffer having an input end for receiving a corresponding gamma reference voltage, and an output end connected to a corresponding second voltage input end node, wherein each dynamic buffer is configured to operate in a first mode or a second mode, and wherein, each dynamic buffer does not output a buffer voltage when operating in the first mode, and outputs the buffer voltage to a second voltage input end node which the dynamic buffer is connected to when operating in the second mode, and wherein, at least a part of dynamic buffers of the plurality of dynamic buffers switch from the first mode to the second mode based on update or change of the display data.

According to another aspect of the present disclosure, there is further provided a gamma voltage generator, and the gamma voltage generator includes: a gamma voltage generating circuit, having a plurality of voltage input end nodes and a plurality of voltage output end nodes, the plurality of voltage output end nodes outputting a predetermined number of gamma voltages based on input voltages from the plurality of voltage input end nodes; and a plurality of buffers, respectively electrically coupled to the plurality of voltage input end nodes, wherein, the gamma voltage generating circuit includes a plurality of resistor units connected in series; a connection node of adjacent resistor units is coupled to one voltage output end node; and each resistor unit is configured to have a second resistance when operating in the second mode less than a first resistance when operating in the first mode.

According to another aspect of the present disclosure, there is further provided a source driver, including: the gamma voltage generator as described above; and a plurality of channel circuits, connected with the gamma voltage generator and used for generating respective data voltages corresponding to input display data by using gamma voltages output by the gamma voltage generator.

According to another aspect of the present disclosure, there is further provided a display apparatus, including a display panel; and the source driver as described above, used for driving the display panel.

By introducing dynamic buffers and/or variable resistor units, the gamma voltage generator according to the embodiment of the present disclosure may reduce an offset of the generated gamma voltages relative to the expected gamma voltages when it is necessary to settle (establish) and stabilize the gamma voltages again (e.g., when it is necessary to update or change the display data), may improve driving capability of the gamma voltages output by the gamma voltage generating circuit, and meanwhile, may accelerate the process of settling and stabilizing the gamma voltage, so as to ensure a display effect. Besides, by changing an operation mode of the dynamic buffers only when the display data changes, overall power consumption may be saved. In addition, in a case where a plurality of source driver circuits drive a same display panel, the plurality of source driver circuits all use the gamma voltage generator according to the embodiment of the present disclosure, which may reduce a display chromatic difference and thus improve a display effect.

BRIEF DESCRIPTION OF THE DRAWINGS

The accompanying drawings are included to provide further understanding of the present disclosure, and the accompanying drawings are incorporated into the specification and form a part of the specification. The accompanying drawings illustrate the embodiments of the present disclosure and are used for explaining principles of the present disclosure together with the description.

DETAILED DESCRIPTION

It should be understood that other embodiments may be utilized and structural changes may be made without departing from the scope of the present disclosure. In addition, it should be understood that the wording and terms used herein are for descriptive purposes and should not be considered limitative. The use of "comprising", "including" or "having" and variations thereof herein is intended to cover items listed thereafter and equivalents thereof as well as additional items. Unless otherwise limited, the term "connection" and variations thereof herein are used in a broad sense and cover direct and indirect connections, and may include electrical or physical connections. Likewise, terms such as "a" "an" or "the" do not denote a limitation of quantity, but denote the presence of at least one. An expression in singular may include an expression in plural, and an expression in plural may also include an expression in singular, unless defined in the context clearly.

Figure 1A:
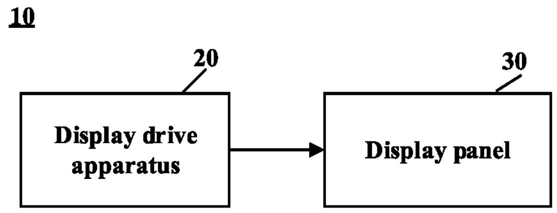
FIG. 1A to FIG. 1B show schematic block diagrams of a display apparatus according to an embodiment of the present disclosure.
Figure 1B:
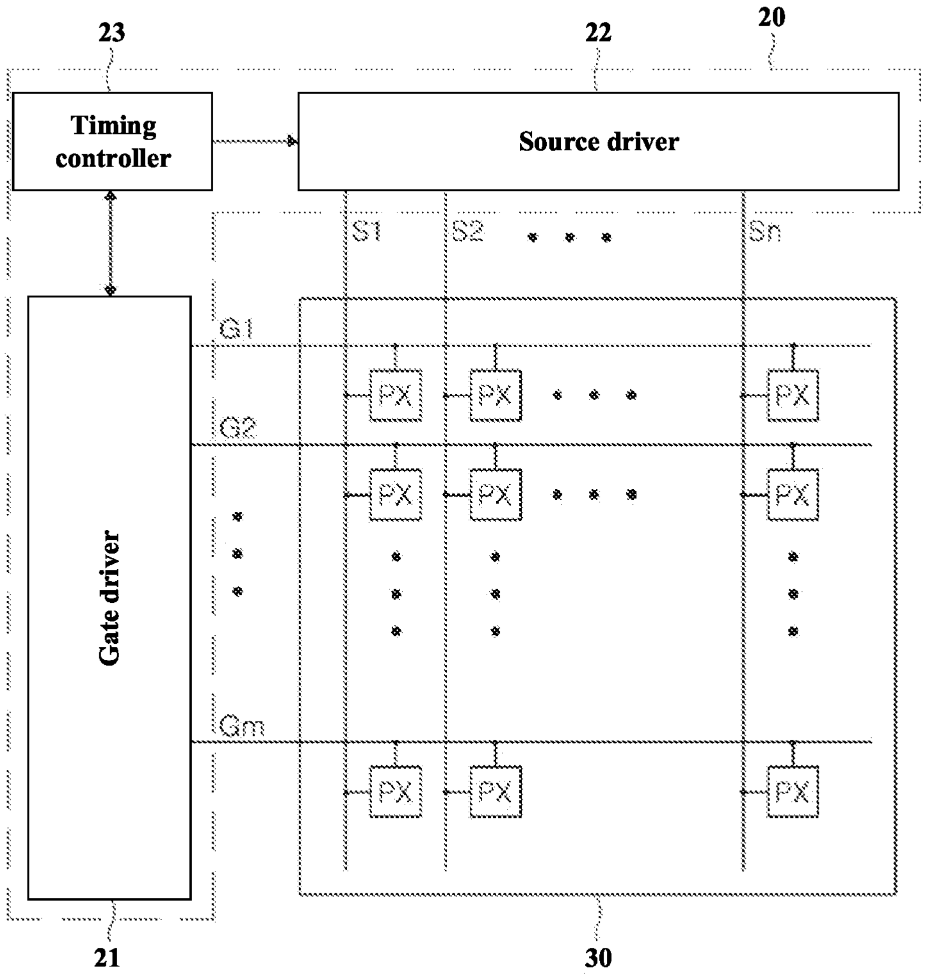

FIG. 1A to FIG. 1B show schematic block diagrams of a display apparatus according to an embodiment of the present disclosure. Referring to FIG. 1A, a display apparatus 10 according to the exemplary embodiment of the present inventive concept may include a display driving apparatus 20 and a display panel 30. In some embodiments of the present disclosure, the display panel 30 may be a Liquid Crystal Display (LCD) panel or an Organic Light Emitting Diode (OLED) panel, but the display panel 30 is not limited to any specific type of display panel.

As shown in FIG. 1B, the display driving apparatus 20 may include: a gate driver 21 and a source driver 22, for inputting display data received from an external processor or the like into the display panel 30; and a timing controller 23, for controlling the gate driver and the source driver. The timing controller 23 may control the gate driver and the source driver according to a vertical synchronization signal and a horizontal synchronization signal. The display panel 30 may include a plurality of pixels PX arranged along a plurality of gate lines G1 to Gm and a plurality of data lines Si to Sn.

The display apparatus 10 may display an image in units of frames. Time required to display one frame may be referred to as a vertical cycle, and the vertical cycle may be determined by a frame rate of the display apparatus 10. During one vertical cycle, the gate driver 21 may sequentially scan the plurality of gate lines G1 to Gm. Time for the gate driver 21 to scan each gate line among the plurality of gate lines G1 to Gm is referred as to a horizontal cycle. During one horizontal cycle (an interval between pulses of two horizontal synchronization signals (Hsync)), the source driver 22 may input data voltages to pixels PX on the respective data lines Si to Sn. Each data voltage may be a voltage output by the source driver 22 based on the display data, and brightness of each pixel PX may be determined by a data voltage corresponding thereto.

The processor used for sending the display data to the display driving apparatus 20 may be an Application Processor (AP) in a case of a mobile apparatus, or may also be a Central Processing Unit (CPU) or a System on Chip (SoC) in a case of a desktop computer, a laptop computer, a television, etc. In detail, the processor may be understood as a processing apparatus having an arithmetic function. The processor may generate the display data to be displayed by the display apparatus 10, or receive the display data from a memory, a communicating module, etc., and send the display data to the display driving apparatus 20.

Figure 2:
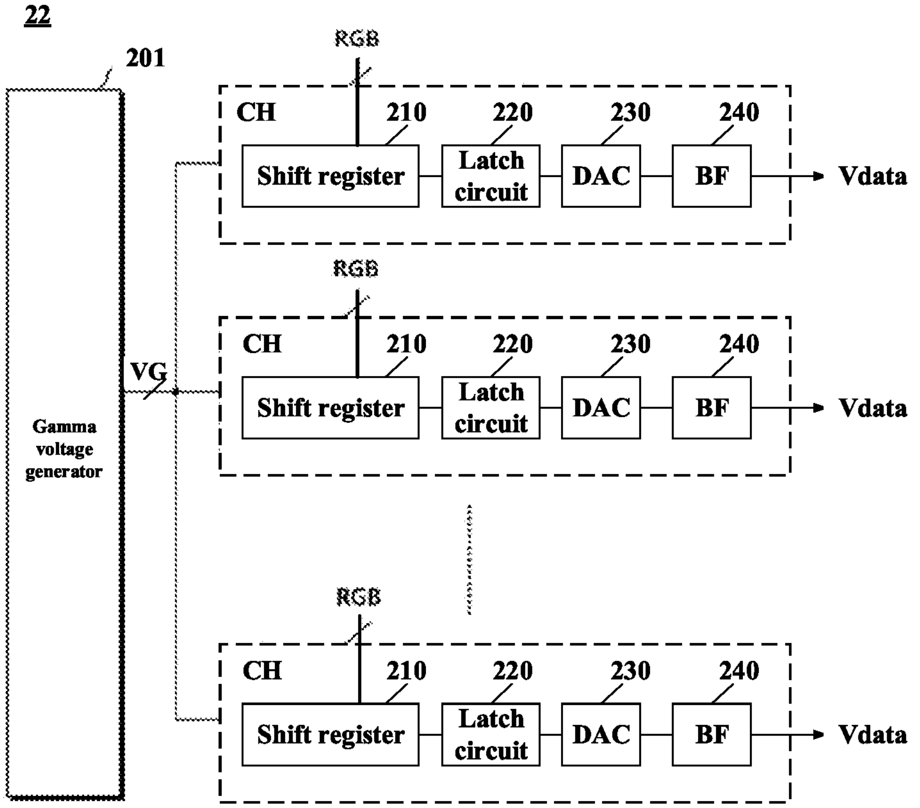
FIG. 2 is an exemplary block diagram of a source driver included in the display apparatus of FIG. 1A to FIG. 1B.

FIG. 2 is an exemplary block diagram of the source driver included in the display apparatus of FIG. 1A to FIG. 1B.

Referring to FIG. 2, the source driver 22 may include a gamma voltage generator 201 and a plurality of channel circuits (CHs). Each channel circuit CH includes a shift register 210, a latch circuit 220, a digital-analog converter (DAC) 230, a source buffer (BF) 240, etc. Each element included in the source driver 22 is not limited to the embodiment shown in FIG. 2, and may be modified in various ways in other embodiments.

The gamma voltage generator 201 generates a plurality of gamma voltages (VGs) and supplies the plurality of gamma voltages (VGs) to each channel circuit CH. The gamma voltage generator 201 may determine the number of the plurality of gamma voltages (VGs) based on the number of bits of the display data. For example, when the display data is 8-bit data, the number of the plurality of gamma voltages VG may be 256 or less; and when the display data is 10-bit data, the number of the plurality of gamma voltages VG may be 1024 or less. In other words, when the display data is n-bit data, the plurality of gamma voltages (VGs) may have at most $2^n$ different voltage values. It should be understood that specific number of the plurality of gamma voltages (VGs) may be selected according to actual situations.

After the shift register 210 receives the corresponding display data (RGB) and captures the same according to timing; the latch circuit 220 may sample and hold the display data according to a shift sequence of the shift register 210. The latch circuit 220 may output the latched display data (RGB) to the digital-analog converter (DAC) 230.

A digital-analog converter (DAC) 230 in each channel circuit CH may generate a data voltage (Vdata) from the plurality of gamma voltages (VGs). The digital-analog converter (DAC) 230 may select at least one of the plurality of gamma voltages (VGs) in response to the latched display data (RGB) from the latch circuit 220, and may output the selected voltage as the data voltage (Vdata). The digital-analog converter (DAC) 230 may include a plurality of switching elements for selecting the at least one of the plurality of gamma voltages. For example, the digital-analog converter (DAC) 230 may output data voltage Vdata corresponding to a gray scale value by using a separate lookup table that defines a relationship between gray scale values and the plurality of gamma voltages, or by performing logical processing on the gray scale value. For example, the data voltage Vdata may have 256 voltage levels corresponding to an 8-bit gray scale value. A data voltage (Vdata) corresponding to each gray scale value may be on a gamma curve. More specifically, the digital-analog converter (DAC) 230 may output the data voltages (Vdata) corresponding to the gamma curve through logic processing on the plurality of gamma voltages in a linear relationship. Or, in some situations, the data voltage may be generated based on more than two selected gamma voltages.

A source buffer 240 in each channel circuit CH may be coupled to one corresponding data line provided in the display panel. The source buffer 240 may receive and amplify the data voltage (Vdata) from the digital-analog converter (DAC) 230, and may apply the amplified data voltage (Vdata) to the corresponding data line. The data voltage Vdata mentioned hereinafter refers to the amplified data voltage Vdata.

Figure 3A:
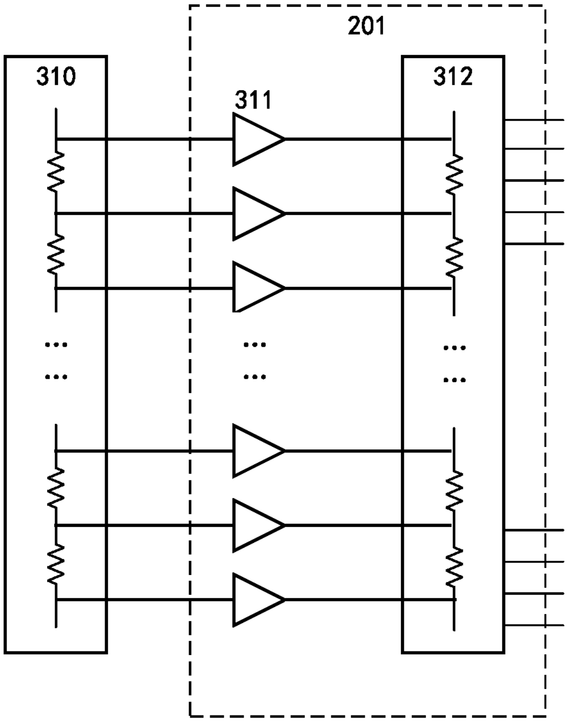
FIG. 3A to FIG. 3B are exemplary circuit diagrams of a gamma voltage generator included in the source driver of FIG. 2.

FIG. 3A is an exemplary circuit diagram of the gamma voltage generator included in the source driver 22 of FIG. 2. The source driver may include a source driver circuit, for example, an Integrated Circuit (IC).

As shown in FIG. 3A, the gamma voltage generator 201 of the source driver includes a plurality of buffers 311 and a gamma voltage generating circuit 312, and the source driver 22 may further include a gamma reference voltage circuit 310. The gamma reference voltage circuit 310 may be located inside or outside the gamma voltage generator 201.

The gamma reference voltage circuit 310 provides a plurality of gamma reference voltages for generating gamma voltages. Each buffer has an input end for receiving a gamma reference voltage, and an output end for outputting a buffer voltage to the gamma voltage generating circuit 312. The gamma voltage generating circuit 312 generates a plurality of gamma voltages based on a plurality of buffer voltages output by the plurality of buffers. Each buffer may be implemented by an Operational Amplifier (OP), for example, one input end of the operational amplifier is coupled to an output end thereof, and the other input end is coupled to the gamma reference voltage circuit 310 for receiving a corresponding gamma reference voltage.

As an example, the gamma reference voltage circuit 310 may adopt a form of resistor string (which may be referred to as a source resistor string) composed of a plurality of resistors connected in series, to divide an input voltage which is input to two ends of the resistor string, so as to obtain the plurality of gamma reference voltages. Similarly, the gamma voltage generating circuit 312 may also adopt a form of resistor string (which may be referred to as a gamma resistor string) to divide an input voltage which is input to two ends of the resistor string, so as to generate a plurality of gamma voltages. The plurality of buffer voltages output by the plurality of buffers are respectively supplied to a part of connection nodes of adjacent resistors of the gamma resistor string, and at least a part of connection nodes of the gamma resistor string may be coupled to or serve as output end nodes (also referred to as “end points” or “nodes”, etc. for connection) of the gamma voltage generating circuit 312. It should be noted that one resistor symbol shown in the diagram may represent a plurality of resistors.

As described above, rapid settlement and stabilization of respective gamma voltages is crucial to ensure a display effect, so corresponding solutions are needed. For example, in a case of a high frame rate display operation, display time allocated to each frame is relatively short, resulting in high requirements for time for settling the gamma voltages, and respective stable gamma voltages are also favorable for generating accurate data voltages.

In addition, with an increasing size of the display panel, it may be necessary to use two or more source driver circuits (e.g., source driver integrated circuits (ICs)) to drive same display panel. However, due to limitations of fabrication and design process, there may be differences in the gamma voltages generated by the gamma voltage generators respectively included in the two or more source driver circuits driving the same display panel, which may cause non-uniformity of display of the display panel. For example, there is an evident chromatic difference between display areas controlled by different source driver circuits.

Figure 3B:
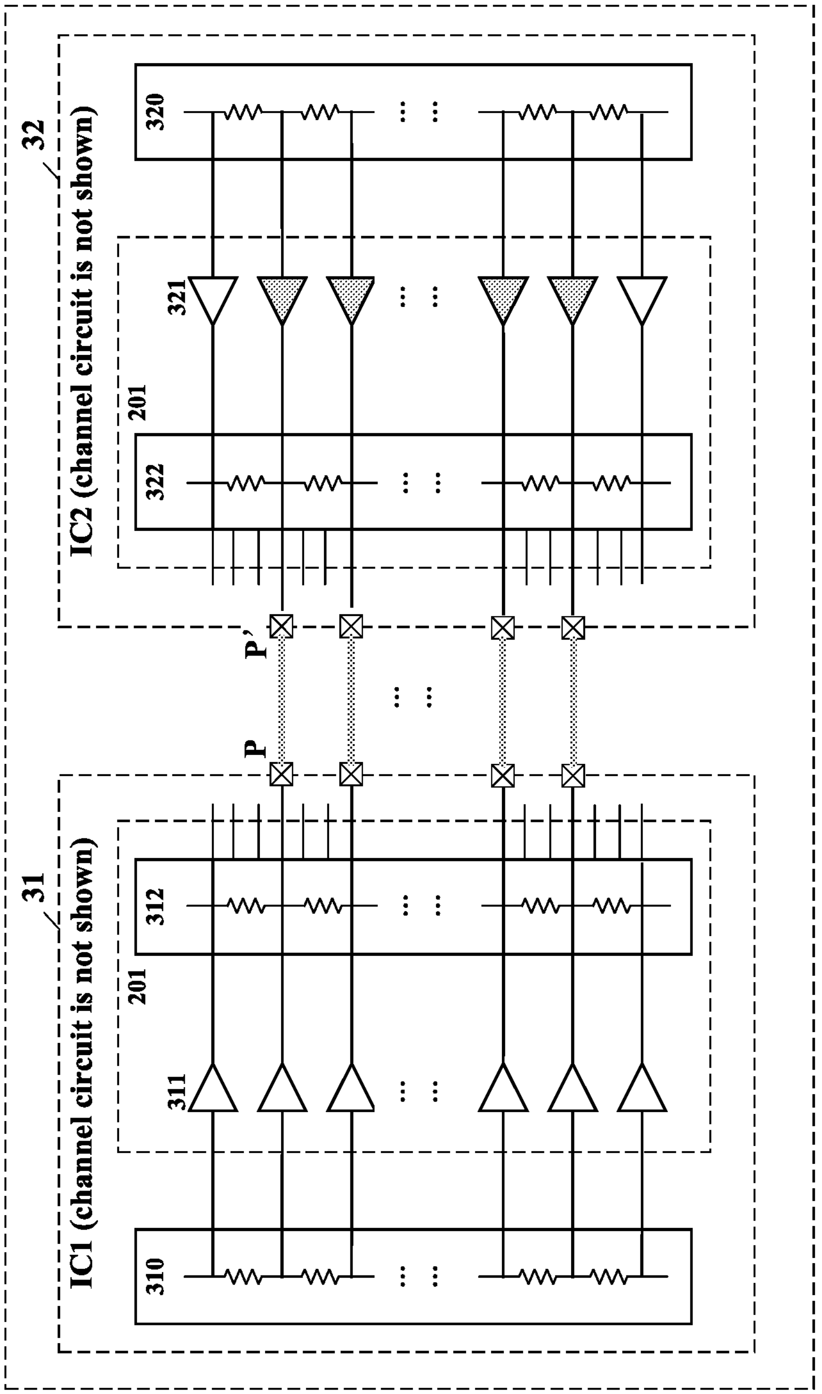

In this regard, FIG. 3B shows an example of including two source driver circuits in the source driver (e.g., each source driver circuit may be integrated into one IC), so that the two source driver circuits jointly drive the same display panel. Of course, the source driver may include more than two source driver circuits.

As shown in FIG. 3B, the first source driver circuit 31 (IC1) and the second source driver circuit 32 (IC2) are of a same circuit structure, and their gamma voltage generators 201 each include a plurality of buffers (311; 321) and a gamma voltage generating circuit (312; 322). Each source driver circuit (31; 32) may further include a gamma reference voltage circuit (310; 320), for example, a source resistor string, for respectively supplying required gamma reference voltages to the gamma voltage generators 201.

At least one power transmission terminal P of the first source driver circuit 31 (IC1) is electrically coupled to at least one corresponding power transmission terminal P' of the second source driver circuit 32 (IC2), to form an electrical connection between the source driver circuit 31 (IC1) and the source driver circuit 32 (IC2). The number of electrical connections between the power transmission terminals of the first source driver circuit 31 (IC1) and the second source driver circuit 32 (IC2) is determined according to design needs, and the present disclosure is not limited to specific number of the electrical connections.

According to the embodiment of the present disclosure, the first source driver circuit 31 (IC1) serves as a master circuit, and the second source driver circuit 32 (IC2) serves as a slave circuit. All buffers in the second source driver circuit 32 (IC2) may be turned off, or, according to the circuit structure (e.g., the connection manner of the source resistor string and the gamma resistor string), all buffers except the buffers that supply a maximum gamma reference voltage and a minimum gamma reference voltage (the same as the maximum gamma reference voltage and the minimum gamma reference voltage in the first source driver) to the second gamma voltage generating circuit are turned off. In such a situation, the at least one power transmission terminal P included in the first source driver circuit 31 (IC1) that serves as an output terminal of the first source driver circuit 31 (IC1) may supply, via the electrical connection(s) between the power transmission terminals of the first source driver circuit 31 (IC1) and the second source driver circuit 32 (IC2), a buffer voltage output from an output end of at least one buffer inside the first source driver circuit 31 (IC1) to the at least one power transmission terminal P' serving as an input terminal of the second source driver circuit 32 (IC2), so as to supply the buffer voltage to the gamma voltage generator inside the second source driver circuit 32 (IC2); and vice versa.

As shown in FIG. 3B, the OFF buffer is shown in gray and the ON buffer is shown in white, and in the second source driver circuit 32, only the two buffers on an uppermost side and a lowest side are turned on and the other buffers are turned off. In this way, through the electrical connections between the power transmission terminals of the above-described two source driver circuits, the plurality of buffer voltages of the plurality of buffers in the first source driver circuit are also supplied to the gamma voltage generating circuit of the second source driver circuit (or more source driver circuits, if any). Therefore, in this way, the voltage difference between gamma reference voltages used by the two source driver circuits and the voltage difference between gamma voltages generated by the two source driver circuits may be reduced, and this is because that the second source driver circuit may generate the plurality of gamma voltages by using the plurality of buffer voltages, the maximum gamma reference voltage and the minimum gamma reference voltage which are the same as those of the first source driver circuit, so when two or more source driver Integrated Circuits (IC) drive a same display panel, display uniformity may be improved to a certain extent, thereby improving a display effect.

In the gamma voltage generator in FIG. 3A to FIG. 3B, gamma voltages at some output end nodes of the gamma resistor string are settled and stabilized through the plurality of buffer voltages output by the plurality of buffers. Because for the gamma resistor string, the gamma voltages at these output end nodes are supplied through the buffer voltages output by some buffers, during division of the input voltage at the two ends of the gamma resistor string, voltages at respective voltage-division nodes may be obtained rapidly, that is, the gamma voltages at all output end nodes may be settled and stabilized as soon as possible, and a driving capability of the generated gamma voltages may be improved. However, according to the number of bits of the gray scale value, the number of the plurality of gamma voltages that need to be generated is usually large, for example, 256, 512 or 1024, etc., and the number of buffers is much smaller (because the buffers may also lead to errors in gamma voltages due to process mismatch, too many buffers will lead to great errors in the gamma voltages), so settlement and stabilization time of the gamma voltages will still be long, which may fail to meet current requirements, especially under a high frame rate display operation. In addition, even if in FIG. 3B, the voltage difference between the gamma reference voltages used by the two source driver circuits and the voltage difference between gamma voltages generated by the two source driver circuits may be reduced, the settlement and stabilization time of the gamma voltages in the slave circuit is still slower than that of the master circuit, due to the parasitic resistance of the wires connected between the power transmission terminals of the two source driver circuits and time required for transmission of an electric voltage signal, which may also lead to a chromatic difference problem in the displayed image, especially in the high frame rate display operation where the requirement on settlement and stabilization time is stricter.

Therefore, a gamma voltage generator capable of rapidly settling and stabilizing the gamma voltages to ensure the display effect of the display panel is needed. In addition, it is also expected that even when two or more source driver circuits (which correspondingly include two or more gamma voltage generators) drive a same display panel, a uniform display effect of the display panel may still be guaranteed based on such gamma voltage generators.

Figure 4:
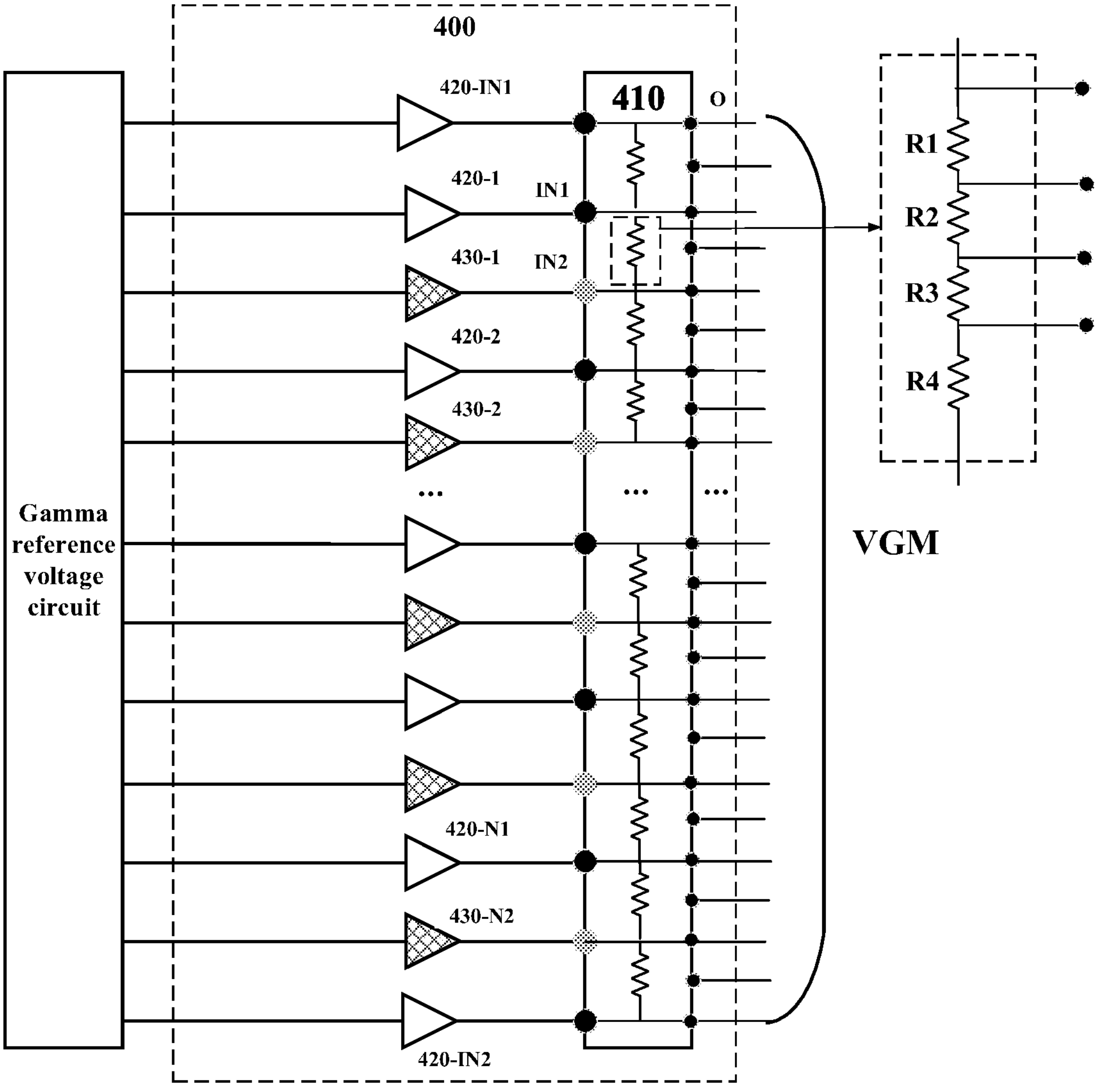
FIG. 4 is an exemplary circuit diagram of the gamma voltage generator according to the embodiment of the present disclosure.

FIG. 4 shows a schematic diagram of a gamma voltage generator according to an embodiment of the present disclosure.

As shown in FIG. 4, the gamma voltage generator 400 includes a gamma voltage generating circuit 410, a plurality of basic buffers (420-IN1/IN2, 420-1, 420-2, . . . , 420-N1, hereinafter collectively referred to as 420) and a plurality of dynamic buffers (430-1, 430-2, . . . , 430-N2, hereinafter collectively referred to as 430). The gamma voltage generator 400 may be included in one source driver circuit (IC), for example, IC1 or IC2 shown in FIG. 3B.

The gamma voltage generating circuit 410 has a plurality of first voltage input end nodes IN1, a plurality of second voltage input end nodes IN2, and a plurality of voltage output end nodes O, and the plurality of voltage output end nodes are used for outputting a predetermined number of gamma voltages. Optionally, the gamma voltage generating circuit 410 may be a gamma resistor string composed of a plurality of resistors connected in series, each connection node between resistors in the gamma resistor string may be taken as or coupled to a voltage output end node, and each input end node of the plurality of first voltage input end nodes IN1 and the plurality of second voltage input end nodes IN2 may act as or be connected to a corresponding voltage output end node O, so that a buffer voltage may be output from the corresponding voltage output end node O (and each buffer voltage may be taken as a gamma voltage). For the purpose of illustration, the plurality of first voltage input end nodes IN1 and the plurality of second voltage input end nodes IN2 are shown separately from the voltage output end nodes O respectively corresponding thereto in FIG. 4, however, it should be understood that each voltage input end node and its corresponding voltage output end node may be a same end node, for example, may be a connection node between adjacent resistors in the gamma resistor string. In addition, a resistor symbol between a pair of adjacent voltage input end nodes shown in FIG. 4 is only for illustration, and actually a plurality of resistors (e.g., in series) (not limited to the shown quantity) may be included for outputting gamma voltages at respective connection nodes (coupled to or taken as voltage output end nodes) of the plurality of resistors.

The input end of each of the plurality of basic buffers 420 receives a corresponding gamma reference voltage (e.g., the input end is connected to one corresponding output terminal of the gamma reference voltage circuit), and the output end thereof is connected to a corresponding first voltage input end node of the plurality of first voltage input end nodes. The input end of each of the plurality of dynamic buffers 430 receives a corresponding gamma reference voltage (e.g., the input end is connected to one corresponding output terminal of the gamma reference voltage circuit), and the output end thereof is connected to a corresponding second voltage input end node of the plurality of second voltage input end nodes, and each dynamic buffer 430 is configured to operate in the first mode or the second mode. Each dynamic buffer 430 does not output a buffer voltage when operating in the first mode, and outputs the buffer voltage to a connected second voltage input end node when operating in the second mode.

For example, for the dynamic buffer 430-1, in the first mode, the dynamic buffer 430-1 is turned off, and a voltage at the input end thereof will not be output to the output end thereof, so the output end will not supply a buffer voltage to the second voltage input end node IN2 connected therewith; in the second mode, the dynamic buffer 430-1 is turned on, and the voltage at the input end thereof will be output to the output end thereof, so the output end will supply the buffer voltage to the second voltage input end node IN2 connected therewith. Other dynamic buffers also operate synchronously with the dynamic buffer 430-1, so in the first mode, the dynamic buffers may be regarded as not operating.

In this way, in a case where the gamma voltage generator 400 is not connected with other gamma voltage generators, or the gamma voltage generator 400 needs to output buffer voltages to other gamma voltage generators (e.g., the gamma voltage generator 400 serves as a master circuit in a case of more than two source driver circuits as described later), the gamma voltage generator 400 may output a plurality of gamma voltages VGM at the plurality of voltage output end nodes O based on the buffer voltages of the plurality of basic buffers and optionally the buffer voltages of the plurality of dynamic buffers. Moreover, in a case where the gamma voltage generator 400 is connected with other gamma voltage generators but does not need to output buffer voltages to other gamma voltage generators (e.g., the gamma voltage generator 400 serves as a slave circuit in a case of more than two source driver circuits as described later), the plurality of basic buffers are not be turned on or only two basic buffers supplying the maximum gamma reference voltage and the minimum gamma reference voltage are turned on.

For example, the first mode is a standby mode, and the second mode is a boost mode. The boost mode is applicable to a period before the predetermined number of generated gamma voltages are stabilized (i.e., a plurality of buffer voltages need to be continued to be provided in order to settle and stabilize the plurality of gamma voltages at the output end nodes of the gamma voltage generator), and the standby mode is applicable to a period after the predetermined number of generated gamma voltages are stabilized.

Therefore, based on the gamma voltage generator 400 shown in FIG. 4, a plurality of dynamic buffers may operate in the second mode when it is necessary to settle and stabilize the gamma voltages, so that the plurality of basic buffers and the plurality of dynamic buffers all supply buffer voltages to the gamma voltage generating circuit 410, which may improve a speed of settling and stabilizing the gamma voltages; and after the gamma voltages are settled and stabilized, the plurality of dynamic buffers operate in the first mode, so as to avoid an unwanted error of gamma voltages introduced by too many buffers.

In addition, in some embodiments, when it is necessary to settle and stabilize the gamma voltages, only some of the plurality of dynamic buffers may operate in the second mode, without all dynamic buffers operating in the second mode. For example, in one embodiment, with respect to a specific image mode, only dynamic buffers that output gamma voltages with a lower value are turned on. In addition, although the dynamic buffers and the basic buffers are alternately arranged in FIG. 4, this is only exemplary. Between every two basic buffers, there may be no dynamic buffer arranged or one or more dynamic buffers arranged, so that there is at least one second voltage input end node or there is no second voltage input end node between each pair of adjacent first voltage input end nodes in the plurality of first voltage input end nodes of the gamma voltage generating circuit. Arrangement of dynamic buffers and the number of dynamic buffers that need to operate in the second mode may be determined in an appropriate manner according to system requirements.

As described with reference to FIG. 2, the gamma voltage generator will be connected with a plurality of channel circuits, and each channel circuit selects at least one gamma voltage from the plurality of gamma voltages output by the gamma voltage generator, according to the display data for a certain pixel (referred to as pixel data) currently loaded to the channel circuit, to generate a data voltage. Each channel circuit is used for sequentially supplying data voltages to a column of pixels on a data line in an order of row scanning. For example, with respect to data writing of a first row of pixels, the plurality of channel circuits need to output Vdata1, Vdata2, . . . to respective data lines corresponding thereto. In this way, for example, in order to generate Vdata1, a first channel circuit needs to select at least one gamma voltage according to the display data (e.g., a gray scale value or data code, also referred to as pixel data) for the pixel on the first row and the first column (the pixel PX(1, 1)), so as to obtain the corresponding data voltage Vdata1; in order to generate Vdata2, a second channel circuit needs to select at least one gamma voltage according to the display data (pixel data) for the pixel on the first row and the second column (the pixel PX(1, 2)), so as to obtain the corresponding data voltage Vdata2. An operation process of other channel circuits with respect to the first row of pixels is also similar. An operation process of the plurality of channel circuits with respect to data writing of other rows of pixels is also similar.

Therefore, the update or change of the display data mentioned in the context of the present disclosure may refer to the update or change of pixel data loaded into one or some channel circuits. For example, after the scanning cycle of the current row of pixels ends, the display data for the next row of pixels is loaded into the plurality of channel circuits, for the plurality of channel circuits to output a plurality of data voltages (the number of which is the same as that of the plurality of channel circuits) to the next row of pixels on the panel. For each channel circuit, the display data (i.e., pixel data) for the pixel loaded into the channel circuit is updated (the value of the pixel data may also change). That is, the update of display data may refer to switching between two pieces of pixel data for two adjacent pixels on the same column loaded into any channel circuit, regardless of whether the two pieces of pixel data have changed. Moreover, the change of display data may refer to the switching between two pieces of pixel data for two adjacent pixels on the same column loaded in any channel circuit, and the two pieces pixel data have changed, for example, the two gray values corresponding to the two pieces of pixel data have changed.

During display process, if the display data changes, data voltages output from one or more channel circuits change. Because the plurality of channel circuits are connected with the voltage output end nodes of the gamma voltage generator, so the plurality of gamma voltages output by the gamma voltage generator will be affected by the change of the data voltages, for example, the channel circuits need to draw current from the gamma resistor string that generates the plurality of gamma voltages, so the plurality of gamma voltages will be interfered; and when the display data updates but does not change, the plurality of gamma voltages output by the gamma voltage generator may not be affected.

That is to say, when the display data changes, that is, when the pixel data applied to any channel circuit changes (which will cause the data voltage to change, thus the plurality of gamma voltages will be affected), it is necessary to rapidly settle and stabilize the plurality of gamma voltages output by the gamma voltage generator again. Therefore, with respect to the gamma voltage generator shown in FIG. 4, when the display data changes, at least a part of the plurality of dynamic buffers may operate in the second mode, so that the at least a part of the plurality of dynamic buffers may also supply buffer voltages to the gamma voltage generating circuit 410, which may be combined with buffer voltages output by the plurality of basic buffers (included in the same gamma voltage generator or other gamma voltage generators), thereby improving a speed of settling and stabilizing the plurality of gamma voltages output by the gamma voltage generator. The at least a part of the plurality of dynamic buffers return to operate in the first mode after the plurality of gamma voltages are settled and stabilized (e.g., after a predetermined period, wherein, the predetermined period may be determined according to the structure of the gamma voltage generating circuit and an empirical value, as long as the predetermined period is capable of allowing the plurality of gamma voltages to be settled and stabilized), to avoid an unwanted error of gamma voltages introduced by too many buffers.

Figure 5:
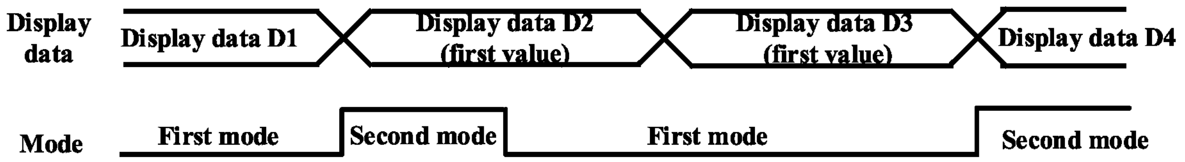
FIG. 5 shows a mode switching timing diagram based on a change of display data according to the embodiment of the present disclosure.

FIG. 5 shows a mode switching timing diagram based on change of display data.

As shown in FIG. 5, if the value of the updated display data (pixel data) is the same as that of the previous display data, for example, display data D2 used for the pixel on the ith (i is an integer greater than or equal to 1) row and the first column (the pixel PX(i, 1)) is the same as the display data D3 used for the pixel on an (i+1)th row and the first column (the pixel PX(i+1, 1)), that is, the display data does not change, then, the plurality of dynamic buffers may not switch from the first mode to the second mode, but keep operating in the first mode (i.e., do not output buffer voltages).

For example, such an implementation is very favorable for the Always On Display (AOD) mode. In the AOD mode, only a small portion of screen displays an AOD image, and when data are written into the pixels in the remaining region displaying no image, it may be considered that there is no change in the two pieces of display data for two adjacent pixels on the same column in the region, so the plurality of dynamic buffers keep operating in the first mode during these scanning cycles corresponding to these pixels in the region, which can save the overall power consumption.

Therefore, the dynamic buffers may operate in the second mode to output the buffer voltages only when the display data changes, which saves overall power consumption; because with respect to a case where the display data does not change (e.g., for large-area black images), the dynamic buffers operate in the first mode without outputting the buffer voltages.

In addition, in some cases, even if the display data changes, the plurality of gamma voltages output by the gamma voltage generator may be less affected, and it may not be necessary to settle and stabilize the plurality of gamma voltages again. In these cases, it may be determined whether the plurality of dynamic buffers need to operate in the second mode according to a difference between actual values and expected values of some gamma voltages. For example, since the gamma reference voltage circuit is capable of supplying accurate voltage values (expected values) at the input ends of the plurality of buffers, at least a part of dynamic buffers among the plurality of dynamic buffers may be configured to switch to operate in the second mode, in response to a voltage at an input end of any one dynamic buffer being different from a voltage at a connected second voltage input end node IN2 (which is also an output actual gamma voltage at a voltage output end node), and switch to operate in the first mode after a predetermined period, or in response to voltages at the input ends of these dynamic buffers are the same as the voltages at the plurality of second voltage input end nodes IN2.

In addition, in other implementations, in order to more easily control mode switching of the plurality of dynamic buffers, the plurality of dynamic buffers may be made switch from the first mode to the second mode according to the update of the display data, that is to say, as long as the display data is updated, even if it does not change, the plurality of dynamic buffers (or a part thereof) may also perform mode switching. The update of the display data is synchronized with the shift of the Horizontal synchronization signal (Hsync) or the scan signal, that is, the update cycle of the display data is the same as the scanning cycle.

Figure 6:
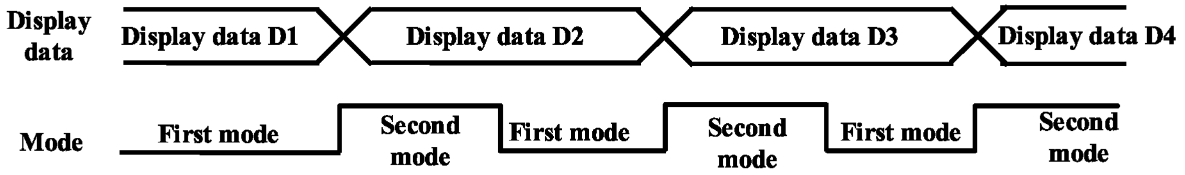
FIG. 6 shows a mode switching timing diagram based on an update of display data according to the embodiment of the present disclosure.

FIG. 6 shows a mode switching timing diagram based on the update of display data according to the embodiment of the present disclosure.

As shown in FIG. 6, switching from the first mode (the standby mode) to the second mode (the boost mode) is synchronized with the update of the display data, that is, when the display data is updated, for example, updated from display data D1 to display data D2, or updated from display data D2 to display data D3, or updated from display data D3 to display data D4, the plurality of dynamic buffers may enter the second mode, then exit the second mode and enter the first mode after a time period. The time period may have a predetermined duration, and the predetermined duration is configured to allow a plurality of gamma voltages output by the gamma voltage generating circuit to be settled and stabilized in the second mode.

In this case, since the update of the display data is synchronized with the shift of the Horizontal synchronization signal (Hsync) or the scan signal, mode switching of the plurality of dynamic buffers may be controlled according to the Horizontal synchronization signal (Hsync) or the scan signal.

Figure 7:
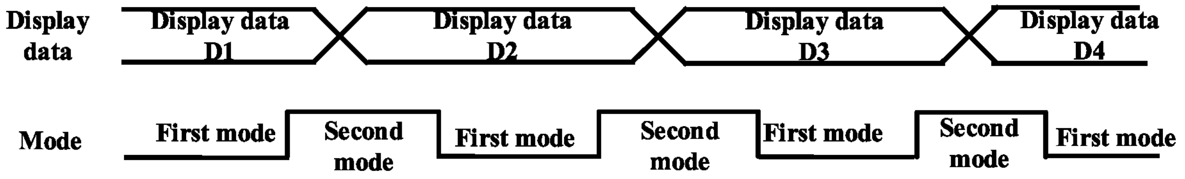
FIG. 7 shows another mode switching timing diagram based on the update of display data according to the embodiment of the present disclosure.

FIG. 7 shows another mode switching timing diagram based on the update of display data according to the embodiment of the present disclosure.

In this embodiment, switching from the first mode (the standby mode) to the second mode (the boost mode) is completed before the update time of the display data, to settle and stabilize the required gamma voltages in advance. It should be noted that since the update of the display data may involve the change of values of the display data, and then cause transition of data voltages, and the transition of data voltages may have great impact on the plurality of gamma voltages, the predetermined duration of the second mode preferably overlaps with the time for the transition of data voltages corresponding to the update or change of the display data, that is, the predetermined duration of the second mode lasts at least until completion of the transition of data voltages.

In the embodiment shown in FIG. 7, the first mode is switched to the second mode at a time point with a predetermined time length prior to the update of display data. Since the source driver processes update timing of display data, it may well control mode switching, and the duration of the second mode may be fixed or may be controlled according to whether the transition of data voltages is completed (the duration of the second mode is not fixed). For example, it can be judged whether the transition of data voltages is completed by detecting the voltage difference between the input ends and output ends of the dynamic buffers as mentioned above, because after the transition of data voltages is completed, the gamma voltages will be little affected, i.e., the detected voltage difference is small.

Hereinafter, several exemplary structures of the dynamic buffer will be introduced in conjunction with FIG. 8 to FIG. 11.

In some implementation modes, each dynamic buffer includes a buffer and a switching module. Components included in the same dynamic buffer can be regarded as corresponding to each other. Each switching module is configured to forbid a corresponding buffer from outputting a buffer voltage in the first mode and allow a corresponding buffer to output a buffer voltage in the second mode.

Optionally, the buffer included in the dynamic buffer may have a same structure as a general buffer, and also have a same structure as a basic buffer, for example, it is composed of an operational amplifier, but is not limited thereto.

Figure 8:
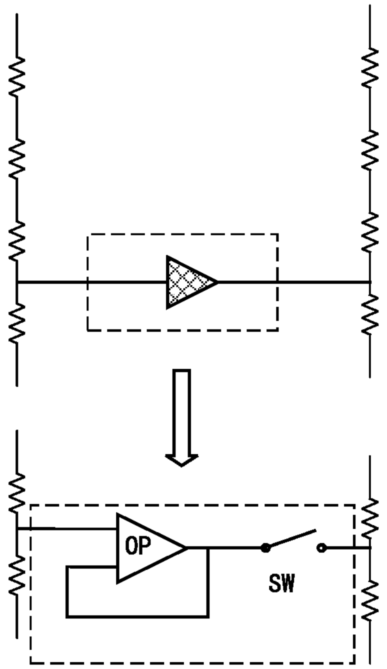
FIG. 8 to FIG. 11 shows exemplary structures of a dynamic buffer according to the embodiment of the present disclosure.

In FIG. 8, each switching module includes a switch SW, and the switch SW has a first end connected to an output end of a corresponding Operational Amplifier (OP), and a second end connected to a second voltage input end node which is connected with an output end of the dynamic buffer including the operational amplifier, wherein, the switch SW is turned off in the first mode so that the dynamic buffer outputs no buffer voltage, and the switch SW is turned on in the second mode so that the dynamic buffer outputs a buffer voltage.

Figure 9:
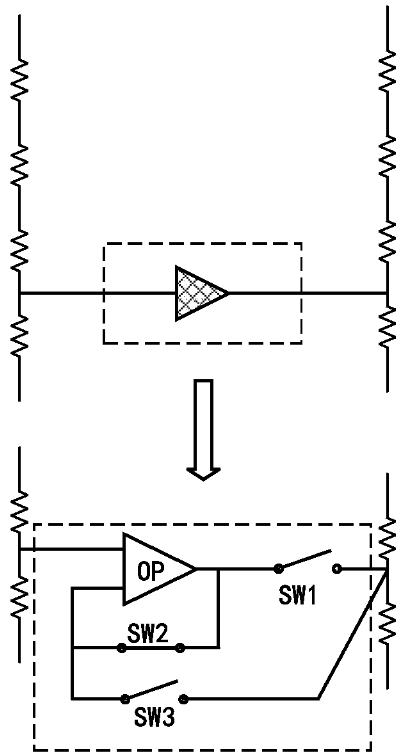

In FIG. 9, each switching module includes a first switch SW1, a second switch SW2 and a third switch SW3, wherein, the first switch SW1 has a first end connected to an output end of a corresponding operational amplifier, and a second end connected to a corresponding second voltage input end node IN2; a first end of the second switch SW2 and a first end of the third switch SW3 are jointly connected to an input end of the corresponding operational amplifier, a second end of the second switch SW2 is connected to the output end of the corresponding operational amplifier, and a second end of the third switch SW3 is connected to the corresponding second voltage input end node IN2. The other input end of the corresponding operational amplifier is used for receiving a gamma reference voltage. In the first mode, the first switch SW1 and the third switch SW3 are simultaneously turned off so that the dynamic buffer outputs no buffer voltage (the second switch SW2 may be either turned on or turned off); in the second mode, the first switch SW1 and the third switch SW3 are simultaneously turned on, and the second switch SW2 is turned off, so that the dynamic buffer outputs a buffer voltage. In such an implementation, feedback control of the dynamic buffer (composed of a connection loop of the input end and the output end of the operational amplifier) may not be affected by parasitic resistance of the switch SW1 connected between the output end of the operational amplifier and the gamma voltage generating circuit, thereby allowing the gamma voltages to be settled and stabilized more accurately and rapidly.

Figure 10:
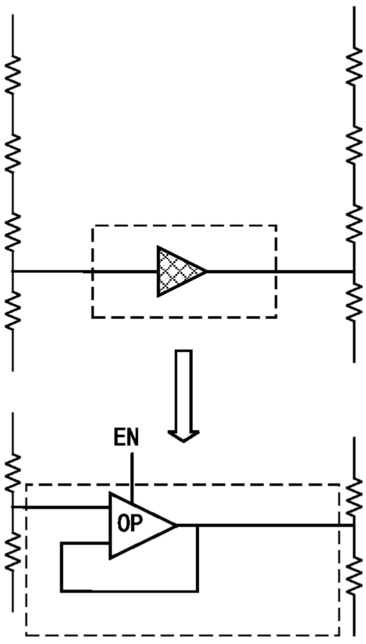

In FIG. 10, each dynamic buffer includes a buffer, wherein, the buffer is used for switching between an enabled state and a disabled state according to an enabling signal, so that the dynamic buffer switches between the first mode and the second mode. For example, the operational amplifier may be enabled or disabled in response to an enabling signal EN from a controller in the source driver, so that the dynamic buffer outputs or does not output the buffer voltage.

In addition, as described above, in a case where the dynamic buffer may switch from the first mode to the second mode in response to a voltage of an input end of any dynamic buffer being different from a voltage at a second voltage input end node that the dynamic buffer is connected to (i.e., at a voltage output end node), the dynamic buffer may further include a voltage difference detecting module in addition to the buffer (e.g., the operational amplifier) and the switching module. Optionally, the voltage difference detecting module may include a comparator.

Figure 11:
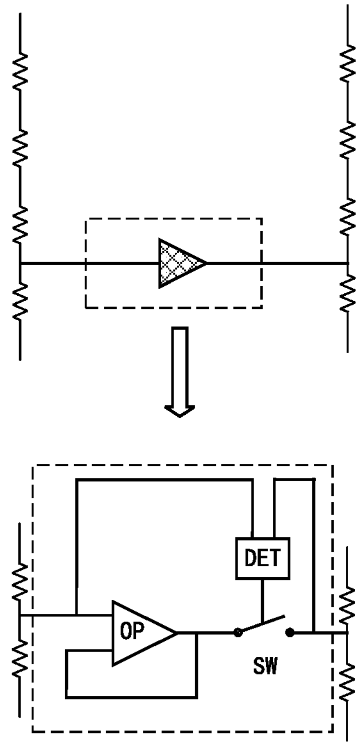

As shown in FIG. 11, each voltage difference detecting module DET has a first detecting end connected with a first input end of its corresponding operational amplifier, and a second detecting end connected to a second voltage input end node that the corresponding dynamic buffer is connected to; and an output end of each voltage difference detecting module outputs a switching control signal.

Each switching module is configured to allow in the second mode or forbid in the first mode, an output end of its corresponding operational amplifier to output the buffer voltage to the second voltage input end node that the corresponding dynamic buffer is connected to, based on the switching control signal of the corresponding voltage difference detecting module or a switching control signal of another voltage difference detecting module.

For example, if a voltage difference detecting module in any one or more dynamic buffers detects that input voltages of two input ends of the voltage difference detecting module are different, for example, a voltage difference exceeds a predetermined threshold (0 or other value), it indicates that the plurality of gamma voltages generated by the gamma voltage generating circuit may be inaccurate, and at this time, it is necessary to settle and stabilize gamma voltages again; and therefore, the voltage difference detecting module may output a switching control signal, so as to control these dynamic buffers or some of these dynamic buffers to jointly operate in the second mode, to settle and stabilize the gamma voltages again.

In FIG. 11, the switching module of the dynamic buffer may also adopt the structures of the switching module shown in reference with FIG. 8 to FIG. 10 above, for example, the implementations of one switch and three switches, and the implementation of the dynamic buffer operating based on the enabling signal, as shown in FIG. 8 to FIG. 10.

In this way, the voltage difference detecting module controls mode switching of the dynamic buffer by detecting a difference between the actual gamma voltages and the expected gamma voltages. Therefore, a duration of the second mode (e.g., ON time of the switch SW in FIG. 8) may be adjusted based on stable performance of respective gamma voltages output by the gamma voltage generator. For example, if the data voltages change with a greater level, such that more currents are drawn from the resistor string of the gamma voltage generating circuit, thereby causing the actual gamma voltages to deviate more severely from the expected gamma voltages, then it may be necessary to control the dynamic buffers to operate in the second mode for a longer duration, to supply higher driving capability, so that the actual gamma voltages can be substantially the same as the expected gamma voltages.

Optionally, although a structure of each dynamic buffer in each source driver circuit is the same in many situations, it is not required so in other situations, as long as these dynamic buffers are capable of performing mode switching synchronously. For example, it is not necessary for all the dynamic buffer to include the voltage difference detecting module; but some dynamic buffers may adopt the structure as described in FIG. 8 to FIG. 10 for example.

The gamma voltage generator as described above with reference to FIG. 4 and FIG. 5 to FIG. 11 includes the dynamic buffers, and the driving capability of the gamma voltages output by the gamma voltage generating circuit and settlement and stabilization speed of the gamma voltages may be improved by making the dynamic buffers output the buffer voltages when the gamma voltages need to be settled and stabilized again. The dynamic buffers output no buffer voltages after the gamma voltages are settled and stabilized to avoid introducing an unwanted error for the gamma voltages. In addition, overall power consumption may be saved by changing the operation mode of the dynamic buffers only when the display data changes, that is, switching the dynamic buffers from the first mode to the second mode, and not changing the operation mode of the dynamic buffer when the display data does not change.

The above-described embodiments of introducing the dynamic buffers may be considered as increasing the driving capability of the gamma voltages output by the gamma voltage generating circuit, which may also be implemented equivalently by reducing the resistance of the resistor string in other embodiments of the gamma voltage generating circuit including the resistor string.

Figure 12A:
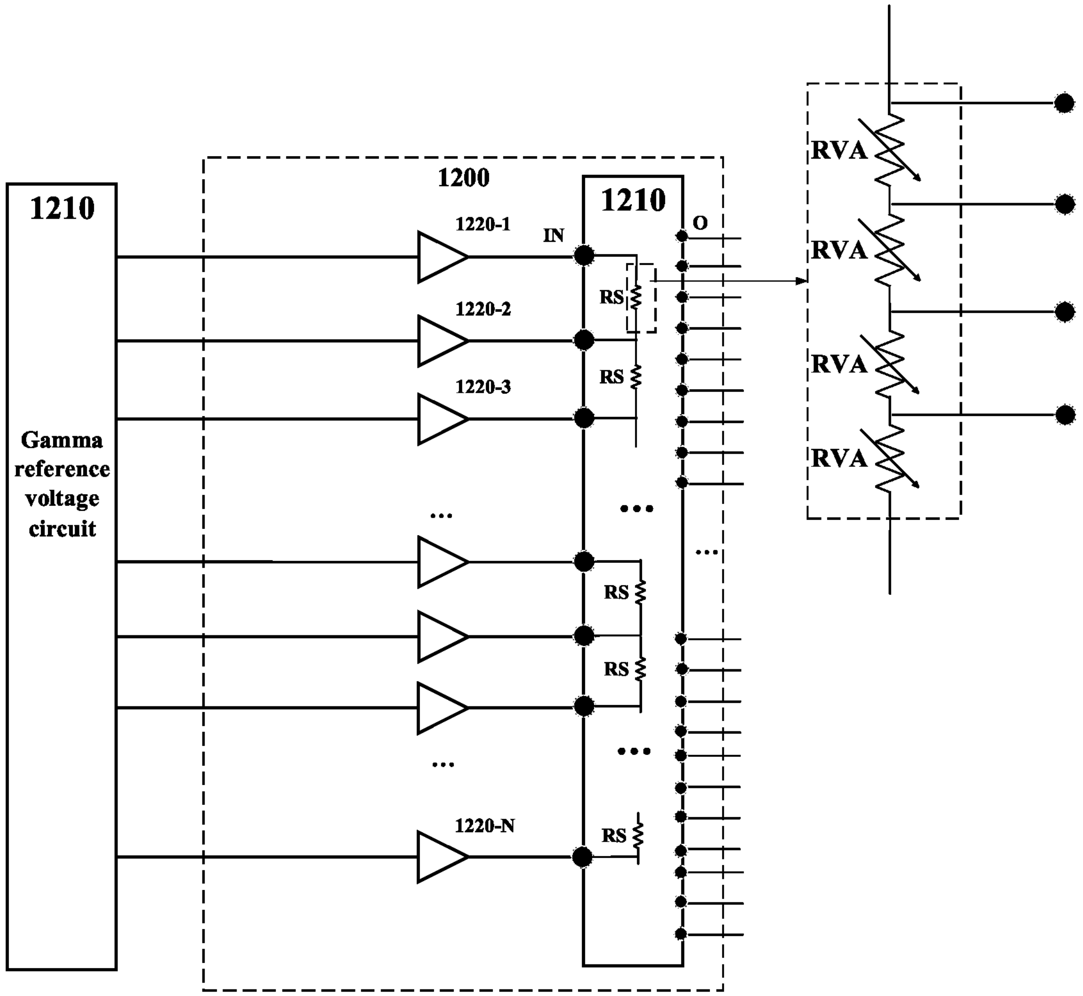
FIG. 12A shows a schematic diagram of another gamma voltage generator according to an embodiment of the present disclosure.

FIG. 12A shows a schematic diagram of another gamma voltage generator according to the embodiment of the present disclosure.

As shown in FIG. 12A, the gamma voltage generator 1200 (which may be the gamma voltage generator in FIG. 2) includes a gamma voltage generating circuit 1210 and a plurality of buffers (1220-1, 1220-2, . . . , 1220-N, hereinafter collectively referred to as 1220). The gamma voltage generator 1200 may be included in an Integrated Circuit (IC) of a source driver.

The gamma voltage generating circuit 1210 has a plurality of voltage input end nodes IN and a plurality of voltage output end nodes O. The plurality of voltage output end nodes are used for outputting a predetermined number of gamma voltages based on input voltages from the plurality of voltage input end nodes IN. In some embodiments where the gamma voltage generating circuit is a gamma resistor string (which includes a plurality of resistor units connected in series according to this embodiment), each voltage input end node may be connected to a corresponding voltage output end node, and each voltage input end node and its corresponding voltage output end node may be a same end node, for example, may be a connection node between adjacent resistor units in the gamma resistor string.

The plurality of buffers 1220 (1220-1, 1220-2, . . . , 1220-N) are respectively electrically connected to the plurality of voltage input end nodes IN. In this way, in a case where the gamma voltage generator 1200 is not connected with other gamma voltage generators, or the gamma voltage generator 1200 needs to output buffer voltages to other gamma voltage generators (e.g., the gamma voltage generator 1200 serves as a master circuit in a case of more than two source driver circuits as described later), the gamma voltage generator 1200 may output a plurality of gamma voltages at the plurality of voltage output end nodes O based on buffer voltages of the plurality of buffers. Moreover, in a case where the gamma voltage generator 1200 is connected with other gamma voltage generators and does not need to output buffer voltages to other gamma voltage generators (e.g., the gamma voltage generator 1200 serves as a slave circuit in a case of more than two source driver circuits as described later), the plurality of buffers may not be turned on or only two buffers that supply the maximum reference voltage and the minimum reference voltage may be turned on.

In order to improve the driving capability of the gamma voltages, the gamma voltage generating circuit includes a plurality of resistor units RVA connected in series, and a connection node of adjacent resistor units RVA is connected to or taken as a voltage output end node. Each resistor unit is configured to have a first resistance in the first mode, have a second resistance in the second mode, and the second resistance is less than the first resistance. The diagram schematically shows a combination of multiple resistor units RVA with a resistor symbol RS. The number of resistor units RVA connected in series represented by each resistor symbol RS may be determined according to the number of gamma voltages that need to be output and not limited to the shown quantity.

In this way, a first time length required for the gamma voltage generating circuit to output the predetermined number of gamma voltages when each resistor unit RVA has the first resistance is greater than a second time length required for the gamma voltage generating circuit to output the predetermined number of gamma voltages when each resistor unit RVA has the second resistance.

Corresponding to the first mode and the second mode of the foregoing dynamic buffer, with respect to the resistor unit according to this embodiment, the first mode is also the standby mode, and the second mode is the boost mode. For example, when it is necessary to settle and stabilize the gamma voltages output by the gamma voltage generator again, the resistor units operate in the boost mode, and after the gamma voltages output by the gamma voltage generator are settled and stabilized, that is, it is not necessary to settle and stabilize the gamma voltages any more, the resistor units operate in the standby mode.

In this way, in the boost mode (the second mode), each resistor unit RVA in the gamma voltage generating circuit may be configured to have a smaller resistance, so that more current may rapidly flow through the plurality of resistor units connected in series, to rapidly settle and stabilize the gamma voltages. In the standby mode (the first mode), each resistor unit RVA may be configured to have a greater resistance, thereby reducing overall power consumption.

Figure 12B:
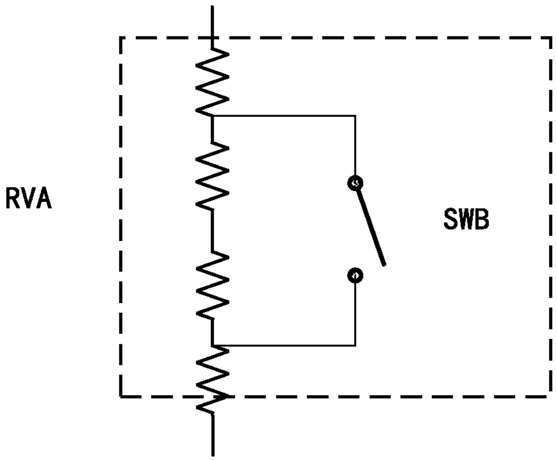
FIG. 12B shows an exemplary circuit structure of a resistor unit.

Optionally, FIG. 12B shows an exemplary circuit structure of a resistor unit. Optionally, with respect to all resistor units in the gamma voltage generating circuit, the resistances of all resistor units in the first mode are the same, and the resistances of all resistor units in the second mode are also the same. For example, all resistor units may have a same circuit structure.

As shown in FIG. 12B, the resistor unit may include a bypass switch SWB and a plurality of resistors connected in series. The bypass switch SWB is connected in parallel with at least one resistor (shown as two in the diagram) in the plurality of resistors, and the bypass switch is configured to be turned on in the second mode and be turned off in the first mode. It may be seen that the resistance (the second resistance) of the resistors connected in series in the resistor unit in the second mode is less than the resistance (the first resistance) of the resistors connected in series in the resistor unit in the first mode.

Optionally, similar to the contents as described above with reference to FIG. 4 to FIG. 11, switching from the first mode to the second mode may also be controlled according to the update or change of the display data.

For example, when the display data input to the plurality of channel circuits is updated, the plurality of resistor units connected in series may switch to operate in the second mode to rapidly settle and stabilize the gamma voltages again, and the plurality of resistor units connected in series may return to operate in the first mode after a predetermined period.

Alternately, as described above, the display data input to the plurality of channel circuits is periodically updated (e.g., based on the horizontal synchronization signal Hsync or the scan signal), so at a time point with a predetermined time length prior to a start point of each update cycle, the plurality of resistor units connected in series may switch to operate in the second mode to rapidly settle and stabilize the gamma voltages again, and the plurality of resistor units connected in series return to operate in the first mode after a predetermined period.

Alternately, as described above, when the display data input to the plurality of channel circuits changes, the plurality of resistor units switch to operate in the second mode, and after a predetermined period, the plurality of resistor units return to operate in the first mode. In this way, overall power consumption may be further reduced. In some embodiments, a processor inside the source driver may determine change of the display data.

Therefore, in the gamma voltage generator as described with reference to FIG. 12A to FIG. 12B, by making the resistance of the resistor unit in the first mode greater than the resistance in the second mode, in the second mode, more current in the gamma voltage generating circuit may rapidly flow through the plurality of resistor units connected in series to settle and stabilize the gamma voltages more rapidly, and after the gamma voltages are settled and stabilized, returning to operate in the first mode may reduce overall power consumption.

Figure 13:
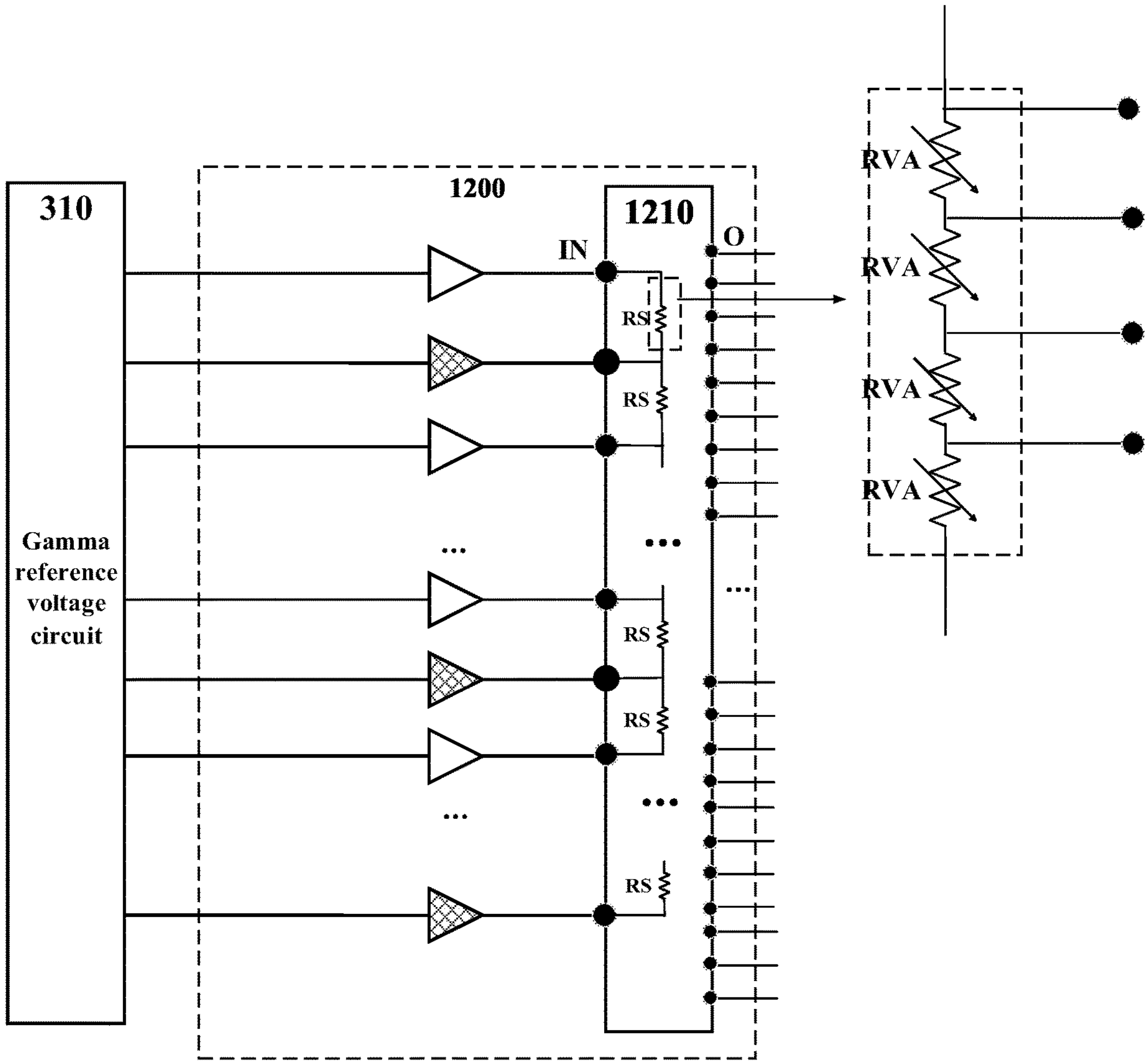
FIG. 13 shows a schematic diagram of another gamma voltage generator according to an embodiment of the present disclosure.

According to some other embodiments, the plurality of dynamic buffers and the plurality of resistor units having a variable resistance as described above may be jointly combined into a same gamma voltage generator. For example, as shown in FIG. 13, the gamma voltage generator 1200 not only includes a plurality of dynamic buffers (shown in a gray pattern) and a plurality of basic buffers (shown in white), and the gamma circuit generating circuit 1210 included thereby includes a plurality of resistor units RVA (having a variable resistance) connected in series. The operation timing and the specific structure of the dynamic buffers and the resistor units have been described in detail above, and no details will be repeated here.

Therefore, in the second mode, the plurality of dynamic buffers, together with the basic buffers, may be connected to the gamma voltage generating circuit 1210 (including a plurality of resistor units connected in series), meanwhile, the plurality of resistor units included in the gamma voltage generating circuit 1210 may have a relatively small resistance (e.g., the bypass switches are turned on). In this way, the solution of combining the dynamic buffers and the resistor units having a variable resistance may further reduce time for settling and stabilizing the gamma voltages, and improve driving capability of the gamma voltages output by gamma voltage generator. Such an implementation may allow the display apparatus to operate at an ultra-high frame rate.

According to another aspect of the present disclosure, there is provided a source driver, and the source driver may include one gamma voltage generator as described above (e.g., referring to FIG. 4 to FIG. 13). For example, the gamma voltage generator may be integrated into a source driver circuit (IC).

In addition, in some other application scenarios, for example, for folding mobile phones equipped with a flexible display screen, the display screen has an increasing size, so the source driver may include more than two source driver circuits (each including a gamma voltage generator) to drive a same display panel, for example, as shown in FIG. 3B.

When the source driver may include more than two source driver circuits, a gamma voltage generator in at least one of the source drivers may adopt the structure of the gamma voltage generator as described with reference to FIG. 4, and accordingly may use the mode switching timing and the switch mode, etc. as described with reference to FIG. 5 to FIG. 11. The source driver circuit that supplies buffer voltages to other source driver circuit via wires between the power transmission terminals of the source driver circuits may be regarded as a master circuit, while the other source driver circuit may be regarded as a slave circuit.

Figure 14:
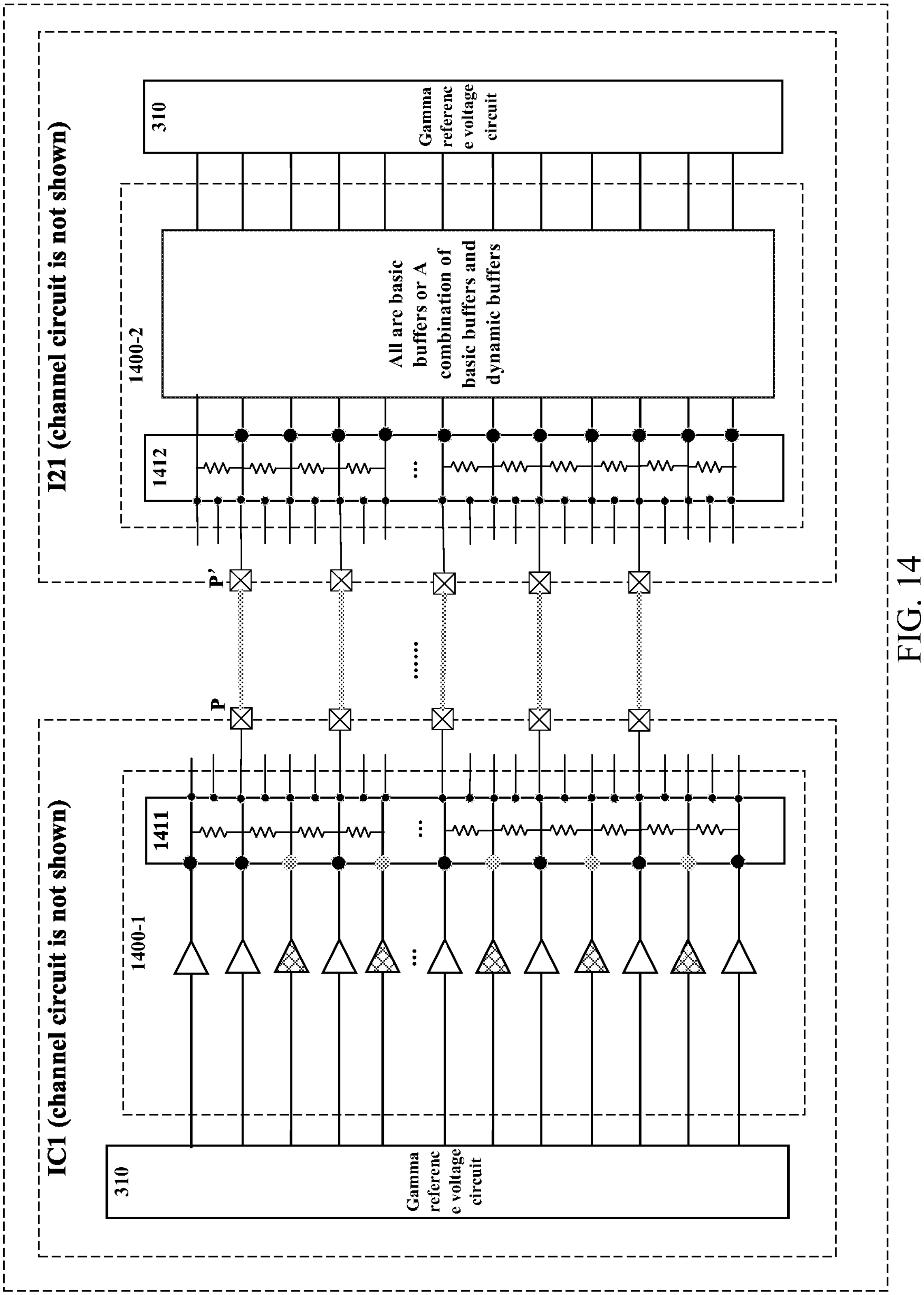
FIG. 14 to FIG. 15 show schematic diagrams of a source driver including two source driver circuits according to the embodiment of the present disclosure.

For example, in the solution based on the dynamic buffers, as shown in FIG. 14, the source driver 1400 may include a first source driver circuit (IC1) and a second source driver circuit (IC2). The first source driver circuit may be regarded as the master circuit, and the second source driver circuit may be regarded as the slave circuit.

At least one of the gamma voltage generator 1400-1 (the first gamma voltage generator) included in the first source driver circuit (IC1) and the second gamma voltage generator 1400-2 included in the second source driver circuit (IC2) may adopt the structure of the gamma voltage generator 400 as described with reference to FIG. 4.

FIG. 14 exemplarily shows a case where the first gamma voltage generator 1400-1 adopts the structure of the gamma voltage generator 400 as described with reference to FIG. 4, and meanwhile the second gamma voltage generator 1400-2 may adopt the structure of the gamma voltage generator 201 as described with reference to FIG. 4 or adopt other structure (e.g., the adopted buffers are all basic buffers as in the related art). However, it should be understood that in other embodiments, it may also be the case that the second gamma voltage generator 1400-2 adopts the structure of the gamma voltage generator 201 as described with reference to FIG. 4, while the first gamma voltage generator 1400-1 adopts the structure of the gamma voltage generator 201 as described with reference to FIG. 4 or other structure. According to the embodiment of the present disclosure, the two gamma voltage generators may have different structures, but the numbers of gamma voltages and voltage values output thereby should be the same. Optionally, since the source driver circuit as a slave circuit may receive buffer voltages from the source driver circuit as a master circuit, there is even no need for the source driver circuit as a slave circuit to include basic buffers (or only two basic buffers that supply the maximum gamma reference voltage and the minimum gamma reference voltage to the gamma voltage generating circuit included thereby are included). Considering that in a case where the gamma voltage generators of the two source driver circuits have different structures, settlement and stabilization time of the gamma voltages output by the gamma voltage generators of the two source driver circuits may be inconsistent, which may lead to a chromatic difference problem in the displayed image. In addition, considering production costs and design complexity, gamma voltage generators of respective source driver circuits usually adopt a same structure, so the first gamma voltage generator 1400-1 and the second gamma voltage generator 1400-2 may adopt a same structure of gamma voltage generator.

Therefore, as an example, when the first gamma voltage generator 1400-1 and the second gamma voltage generator 1400-2 both adopt the structure of the gamma voltage generator as described with reference to FIG. 4, the plurality of basic buffers included in the first gamma voltage generator 1400-1 may output a first group of buffer voltages to corresponding plurality of first voltage input end nodes and transmit the same to the second gamma voltage generator 1400-2; then the second gamma voltage generator 1400-2 may be configured to receive the first group of buffer voltages from the first gamma voltage generator 1400-1 (e.g., via the electrical connections between the power transmission terminals P to P' as described above) for outputting the second predetermined number of gamma voltages. Since the plurality of basic buffers included in the first gamma voltage generator 1400-1 keep outputting the first group of buffer voltages, the second gamma voltage generator 1400-2 may be continuously supplied with the first group of buffer voltages. It should be noted that each power transmission terminal P (taken as an output terminal) of the first source driver circuit (IC1) is connected to a corresponding voltage output end node of the gamma voltage generating circuit 1411 and a corresponding first voltage input node, so that the buffer voltage may be received from a corresponding basic buffer and the buffer voltage is taken as the output voltage at the power transmission terminal P.

The structure of the second gamma voltage generator 1400-2 is also the same as that of the first gamma voltage generator 1400-1, and includes: a second gamma voltage generating circuit 1412, a plurality of basic buffers (i.e., a second set of basic buffers) and a plurality of dynamic buffers (i.e., a second set of dynamic buffers). Wherein, the second gamma voltage generating circuit 1412 has a second set of first voltage input end nodes, a second set of second voltage input end nodes, and a second set of voltage output end nodes. The second set of basic buffers have input ends respectively receive corresponding gamma reference voltages, and have output ends respectively connected to the second set of first voltage input end nodes. The second set of dynamic buffers have input ends respectively receive corresponding gamma reference voltages, and have output ends respectively connected to the second set of second voltage input end nodes, and are configured to operate in the first mode or the second mode synchronously with the plurality of dynamic buffers in the first gamma voltage generator 1400-1. It should be noted that the expression of the "second set" of certain elements in present application is used to distinguish it from the expression of the plurality of corresponding elements (i.e., regarded as the "first set" of certain elements) included in the first gamma voltage generating circuit 1411.

The second set of first voltage input end nodes of the second gamma voltage generating circuit 1412 included in the second gamma voltage generator 1400-2 receive the first group of buffer voltages from the first gamma voltage generator 1400-1; the second set of dynamic buffers output the second group of buffer voltages to the second set of second voltage input end nodes in the second mode, and do not output the second group of buffer voltages in the first mode; and the second gamma voltage generating circuit 1412 outputs the second predetermined number of gamma voltages at the second set of voltage output end nodes of the second gamma voltage generator 1400-2, based on the first group of buffer voltages and the second group of buffer voltages (in the second mode) or based on the first group of buffer voltages (in the first mode).

That is to say, in a case where it is necessary to settle and stabilize the gamma voltages again, (all or some (which is set according to system requirements) of) the dynamic buffers in the first gamma voltage generator 1400-1 and the second gamma voltage generator 1400-2 operate in the second mode, to output the buffer voltages. The first group of buffer voltages output by the basic buffers of the first gamma voltage generator 1400-1 are supplied to the second gamma voltage generator 1400-2, so that the second gamma voltage generator 1400-2 may generate gamma voltages based on the second group of buffer voltages output by the dynamic buffers included by itself and the first group of buffer voltages from the first gamma voltage generator 1400-1, and thus the second gamma voltage generator 1400-2 may speed up the settlement and stabilization of the gamma voltages to a certain extent, as compared with the case where only the first group of buffer voltages from the first gamma voltage generator 1400-1 are taken as basis, so the two source driver circuits may be close in terms of settlement and stabilization time of gamma voltages, which may reduce a display chromatic difference, and improve a display effect.

For another example, in the solution based on the resistor units having a variable resistance, at least one of the gamma voltage generator 1500-1 (the first gamma voltage generator) included in the first source driver circuit (IC1) and the second gamma voltage generator 1500-2 included in the second source driver (IC2) may adopt the structure of the gamma voltage generator 201 as described with reference to FIG. 12A to FIG. 12B. In addition, the mode switching timing and the switch mode as described with reference to FIG. 5 to FIG. 11 may be used accordingly. The source driver circuit that supplies buffer voltages to other source driver circuit via wires between the power transmission terminals of the source driver circuits may be regarded as a master circuit, while the other source driver circuit may be regarded as a slave circuit.

Figure 15:
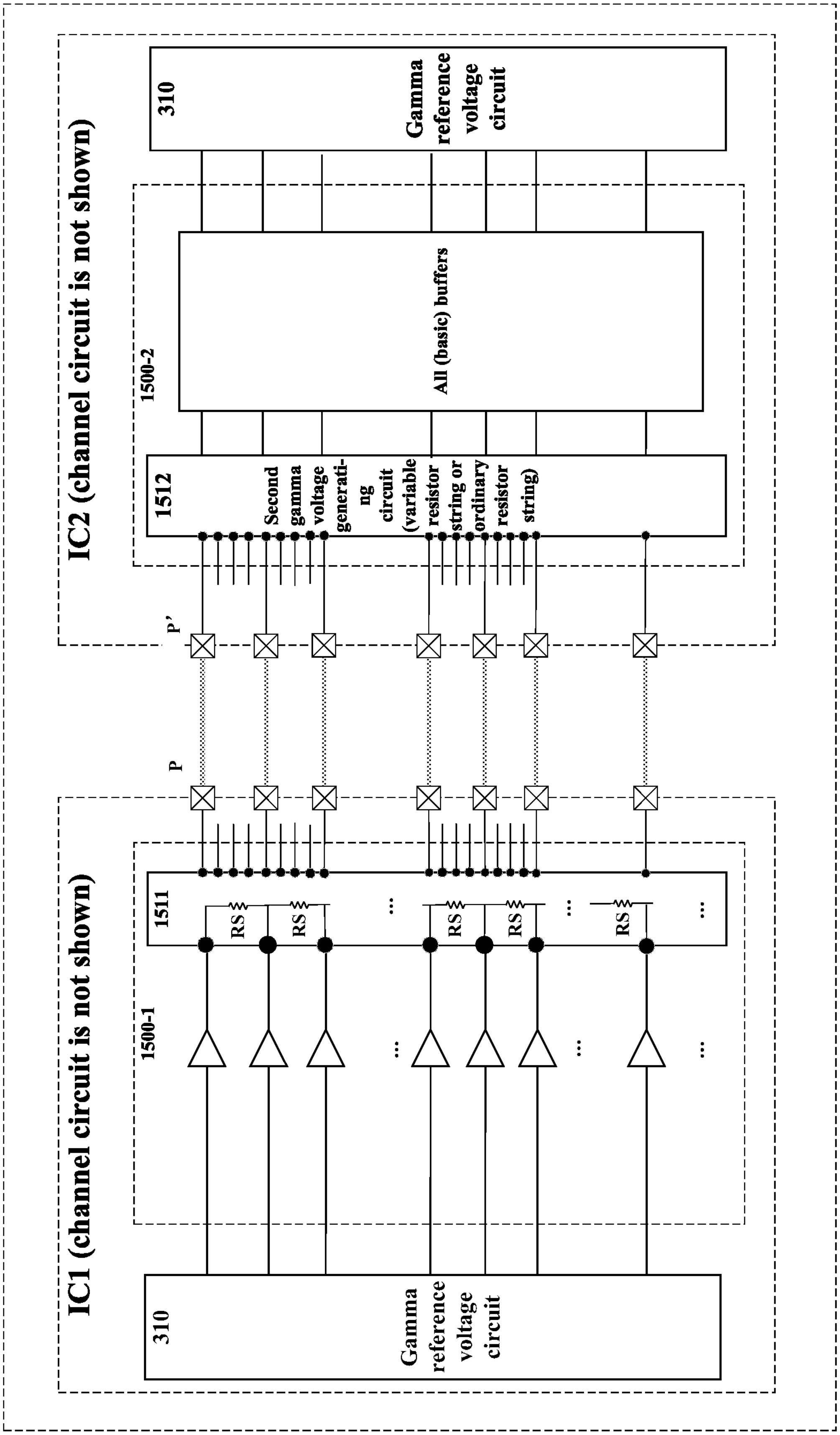

FIG. 15 exemplarily shows a case where the first gamma voltage generator 1500-1 adopts the structure of the gamma voltage generator 1200 as described with reference to FIG. 12A to FIG. 12B, and meanwhile the second gamma voltage generator 1500-2 may adopt the structure of the gamma voltage generator 1200 as described with reference to FIG. 12A to FIG. 12B, or adopt other structure. However, it should be understood that in other embodiments, the second gamma voltage generator 1500-2 may adopt the structure of the gamma voltage generator 1200 as described with reference to FIG. 12A to FIG. 12B, while the first gamma voltage generator 1500-1 adopts the structure of the gamma voltage generator 1200 as described with reference to FIG. 12A to FIG. 12B or other structure (e.g., the resistor string structure as adopted in the related art). The two gamma voltage generators may have different structures, but the numbers of gamma voltages and voltage values output thereby should be the same. Optionally, since the source driver circuit as a slave circuit may receive buffer voltages from the source driver circuit as a master circuit, there is even no need for the source driver circuit as a slave circuit to include buffers (or only two buffers that supply the maximum gamma reference voltage and the minimum gamma reference voltage to the gamma voltage generating circuit included thereby are included).

Similarly, as described above, the first gamma voltage generator 1500-1 and the second gamma voltage generator 1500-2 may adopt the same structure of gamma voltage generator out of consideration of display effect, production costs, and design complexity.

Therefore, as an example, when the first gamma voltage generator 1500-1 and the second gamma voltage generator 1500-2 both adopt the structure of the gamma voltage generator as described with reference to FIG. 12A to FIG. 12B, a plurality of buffers included by the first gamma voltage generator 1500-1 may output the first group of buffer voltages to corresponding voltage input end nodes, and then the second gamma voltage generator 1500-2 may be configured to receive the first group of buffer voltages from the first gamma voltage generator 1500-1, for outputting the second predetermined number of gamma voltages.

The second gamma voltage generator 1500-2 has a same structure as that of the first gamma voltage generator 1500-1, and includes: a second gamma voltage generating circuit, and a second set of buffers, wherein, the second gamma voltage generating circuit has a second set of voltage input end nodes and a second set of voltage output end nodes. The second set of buffers have input ends respectively receive corresponding gamma reference voltages, and have output ends respectively connected to the second set of first voltage input end nodes. The second set of voltage input end nodes receive the buffer voltages from the first gamma voltage generator 1500-1. The second gamma voltage generating circuit 1500-2 includes a second set of resistor units connected in series, and a connection node of adjacent resistor units is connected to or taken as a voltage output end node. Each resistor unit of the second set of resistor units is configured to switch between the first mode and the second mode synchronously with the resistor units in the first gamma voltage generator 1500-1.

That is to say, in a case where it is necessary to settle and stabilize the gamma voltages again, the resistor units in the second gamma voltage generator 1500-2 operate in the second mode, to generate the gamma voltages based on the buffer voltages from the first gamma voltage generator 1500-1 in a case of the resistor units having a smaller resistance, so that the second gamma voltage generator 1500-2 may speed up the settlement and stabilization of the gamma voltages to a certain extent, as compared with a case where the resistor units having a variable resistance are not provided, so the two source driver circuits may be close in terms of settlement and stabilization time of gamma voltages, which may reduce a display chromatic difference, make display more uniform, and improve a display effect.

In addition, it should be noted that although it is exemplarily described in FIG. 14 to FIG. 15 that when the source driver may include two source driver circuits, at least one of the source driver circuits adopts the solution based on dynamic buffers or the solution based on resistor units having a variable resistance, yet it should be understood that the source driver may include more source driver circuits, and at least one of the source driver circuits adopts the solution based on dynamic buffers or the solution based on resistor units having a variable resistance. In addition, the at least one source driver circuit may adopt both the solution based on dynamic buffers and the solution based on resistor units having a variable resistance, for example, the at least one source driver circuit may include the gamma voltage generator as shown in FIG. 13.

In addition, if a gamma voltage generator inside each source driver circuit is fast enough to settle and stabilize gamma voltages, the difference in time between the gamma voltage generators of the source driver circuits to settle and stabilize the gamma voltages is also small, and may be regarded as consistent. Therefore, when the source driver may include at least two source driver circuits, each source driver circuit may randomly adopt any one of the solution based on dynamic buffers (e.g., FIG. 4), the solution based on resistor units having a variable resistance (e.g., FIG. 12) and the solution based on dynamic buffers and resistor units having a variable resistance (e.g., FIG. 13).

It should be understood that the source driver may further include other circuit; and the other circuit is configured to cooperate with the gamma voltage generator of each source driver circuit in the source driver to generate gamma voltages and drive the display panel. Those skilled in the art will understand the structure and operation of other circuit as shown in FIG. 2 to FIG. 15, so detailed description of other circuit are omitted herein. Accordingly, another aspect of the present disclosure further provides a display apparatus. The display apparatus may be the display apparatus as shown in FIG. 1, and includes a display panel and a source driver, wherein, the source driver may include a gamma voltage generator as described with reference to FIG. 4 to FIG. 13, or include at least two gamma voltage generators, and at least one gamma voltage generator of the at least two gamma voltage generators is the gamma voltage generator as described with reference to FIG. 4 to FIG. 13, or both are the gamma voltage generators as described with reference to FIG. 4 to FIG. 13.

Those skilled in the art will understand that various modifications and changes may be made to the structure of the disclosed embodiments without departing from the scope or spirit of the present disclosure. In view of the foregoing contents, it is hoped that the present disclosure will cover modifications and changes to the present disclosure within the scope of the appended claims and equivalents thereof.

The invention claimed is:

1. A gamma voltage generator, connected with a plurality of channel circuits and used for outputting a predetermined number of gamma voltages, each channel circuit selecting at least one gamma voltage according to input display data to generate a corresponding data voltage, wherein, the gamma voltage generator comprises:

a gamma voltage generating circuit, having a plurality of first voltage input end nodes, a plurality of second voltage input end nodes, and a plurality of voltage output end nodes;

a plurality of basic buffers, each basic buffer having an input end for receiving a corresponding gamma reference voltage, and an output end connected to a corresponding first voltage input end node; and a plurality of dynamic buffers, each dynamic buffer having an input end for receiving a corresponding gamma reference voltage, and an output end connected to a corresponding second voltage input end node, wherein each dynamic buffer is configured to operate in a first mode or a second mode, and wherein each dynamic buffer does not output a buffer voltage when operating in the first mode, and outputs the buffer voltage to the corresponding second voltage input end node which the dynamic buffer is connected to when operating in the second mode, wherein, at least a part of dynamic buffers of the plurality of dynamic buffers are configured to:

switch to operate in the second mode, in response to a voltage at an input end of any one dynamic buffer of the plurality of dynamic buffers being different from a voltage at the corresponding second voltage input end node which the one dynamic buffer is connected to, and switch to operate in the first mode, after a predetermined period or in response to voltages at the input end nodes of all dynamic buffers being the same as voltages at the plurality of second voltage input end nodes.

2. The gamma voltage generator according to claim 1, wherein, each dynamic buffer comprises a buffer, a switching module and a voltage difference detecting module, the voltage difference detecting module of each dynamic buffer has a first detecting end connected with a first input end of the buffer included in the dynamic buffer, a second detecting end connected with the corresponding second voltage input end node which the dynamic buffer is connected to, and an output end for outputting a switch control signal; and the switching module of each dynamic buffer is configured to allow in the second mode or forbid in the first mode, the buffer included in the dynamic buffer to output a buffer voltage to the corresponding second voltage input end node which the dynamic buffer is connected to, based on the switch control signal of the voltage difference detecting module included in the dynamic buffer or other voltage difference detecting module.

3. The gamma voltage generator according to claim 1, wherein, each dynamic buffer comprises a buffer and a switching module, the switching module of each dynamic buffer is configured to: forbid in the first mode and allow in the second mode, the buffer included in the dynamic buffer to output a buffer voltage to the corresponding second voltage input end node which the dynamic buffer is connected to.

4. The gamma voltage generator according to claim 3, wherein, the switching module of each dynamic buffer comprises a switch, and the switch has a first end connected to an output end of the buffer included in the dynamic buffer, and a second end connected to the corresponding second voltage input end node which the dynamic buffer is connected to, and the switch is turned off in the first mode and turned on in the second mode.

5. The gamma voltage generator according to claim 3, wherein, the switching module of each dynamic buffer comprises a first switch, a second switch, and a third switch, wherein:

the first switch has a first end connected to an output end of the buffer included in the dynamic buffer, and a second end connected to the corresponding second voltage input end node which the dynamic buffer is connected to;

a first end of the second switch and a first end of the third switch are jointly connected to a first input end of the buffer included in the dynamic buffer, a second input end of the buffer included in the dynamic buffer receives a gamma reference voltage corresponding to the dynamic buffer, a second end of the second switch is connected to an output end of the buffer included in the dynamic buffer, and a second end of the third switch is connected to the corresponding second voltage input end node which the dynamic buffer is connected to;

wherein, in the first mode, the first switch and the third switch are simultaneously turned off, and in the second mode, the first switch and the third switch are simultaneously turned on, and the second switch is turned off.

6. The gamma voltage generator according to claim 1, wherein, each dynamic buffer comprising a buffer, wherein, the buffer switches between an enabled state and a disabled state according to an enabling signal, to output or not output the buffer voltage to the corresponding second voltage input end node which the dynamic buffer is connected to.

7. The gamma voltage generator according to claim 1, wherein, the at least a part of dynamic buffers synchronously switch between the first mode and the second mode.

8. The gamma voltage generator according to claim 1, wherein, there is at least one second voltage input end node or there is no second voltage input end node between each pair of adjacent first voltage input end nodes among the plurality of first voltage input end nodes.

9. The gamma voltage generator according to claim 1, wherein, the gamma voltage generating circuit comprises a plurality of resistor units connected in series, and a connection node of adjacent resistor units is taken as or connected to a voltage output end node; and each resistor unit has a first resistance when the at least a part dynamic buffers operate in the first mode, and has a second resistance when the at least a part of dynamic buffers operate in the second mode, wherein the first resistance is greater than the second resistance.

10. The gamma voltage generator according to claim 9, wherein, each resistor unit comprises a bypass switch and a plurality of resistors connected in series, and the bypass switch is connected in parallel with at least one resistor among the plurality of resistors; and the bypass switch is configured to be turned on when the at least a part of dynamic buffers operate in the second mode, and to be turned off when the at least a part of dynamic buffers operate in the first mode.

11. The gamma voltage generator according to claim 1, wherein, the first mode is a standby mode, and the second mode is a boost mode;

the boost mode is applicable to a period before the generated predetermined number of gamma voltages are stabilized, and the standby mode is applicable to a period after the generated predetermined number of gamma voltages are stabilized.

12. A source driver, comprising:

the gamma voltage generator according to claim 1; and a plurality of channel circuits, connected with the gamma voltage generator and used for generating respective data voltages corresponding to input display data by using gamma voltages output by the gamma voltage generator.

13. A display apparatus, comprising:

a display panel; and the source driver according to claim 12, used for driving the display panel.

* * * * *